April 25, 1944.  J. HULMAN ET AL  2,347,196

VACUUM SYSTEM BOOSTER

Original Filed Aug. 6, 1941

INVENTORS
JULIUS HULMAN
BERNARD BEAMAN
ATTORNEYS

Patented Apr. 25, 1944

2,347,196

UNITED STATES PATENT OFFICE 2,347,196

VACUUM SYSTEM BOOSTER

Julius Hulman and Bernard Beaman,
Dayton, Ohio

Original application August 6, 1941, Serial No. 405,673. Divided and this application January 5, 1942, Serial No. 425,678

5 Claims. (Cl. 230—2)

(Granted under the act of March 3, 1883, as amended April 30, 1928; 370 O. G. 757)

The invention described herein may be manufactured and used by or for Government for governmental purposes, without the payment to us of any royalty thereon.

This invention is a division of our co-pending application Serial No. 405,673, filed August 6, 1941, now Patent No. 2,304,096, of December 8, 1942, for a Fluid system pressure booster, and relates to a booster which is particularly applicable to a vacuum system wherein a fluid is moved against a resistance.

The resistance may comprise no more than the friction encountered by the fluid in moving through the system, or it may include additional resistance, but in any event some pressure creating means is required at some part of the system to maintain flow.

Whatever the form that such pressure creating instrumentality may take, there will be a difference in pressure, as between the upstream and downstream side thereof, in the system, such difference usually being greater as the resistance to be overcome is higher.

Such pressure difference is, of course, a function of a fluid system of this character, but there are many instances where the pressure drop on the low side is so great as to be highly objectionable.

It is therefore an object of this invention to provide means which may be incorporated in a fluid system of the general class above mentioned, and which will have the effect of raising the pressure at points where it may become undesirably low.

Another object is to provide a device of this kind which may be added to a conventional fluid system with little or no difficulty in installation.

Other objects and advantages and meritorious features will become evident as the following detailed description is read with reference to the drawing, wherein.

Figure 1:
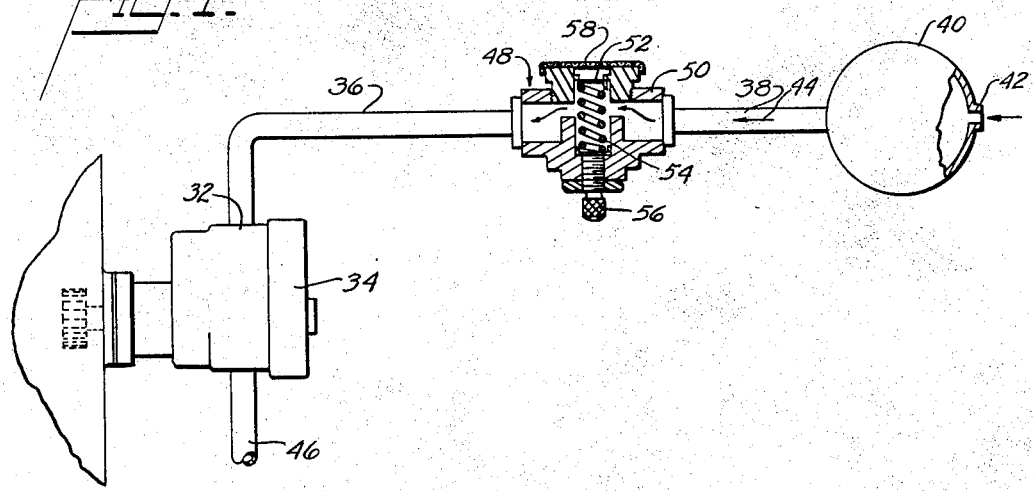
Figure 1 shows a conventional vacuum system used for maintaining a vacuum supply for operating vacuum motored instruments, etc.

Systems for creating and maintaining a vacuum supply have numerous applications, and this is partciularly true in aircraft, where gyroscopes, cameras and other instruments are vacuum operated. A conventional vacuum system of this class is shown in Figure 1, where the inlet 32 of a vacuum pump 34 is connected by pipes 36 and 38 to the instrument 40 which is to be vacuum operated. A vent 42 admits air to the instrument which passes through the pipes in the direction of the arrow 44, through the pump and out at 46, where it may be connected to and used for operating air pressure actuated equipment if so desired.

In order that the vacuum for operating the instrument 40 may be maintained at a desired value, a bleed type relief valve 48 is connected in the system between the instrument and the pump 34. This valve comprises a body 50 having a suction opened valve disc 52 held on its seat by a spring 54, the stress of which is adjustable by the screw 56. A screen 58 prevents foreign matter from entering the valve. The screw 56 is adjusted so as to allow more or less of the pump's capacity to enter through the screen until the desired amount only flows through the instrument.

Figure 2:
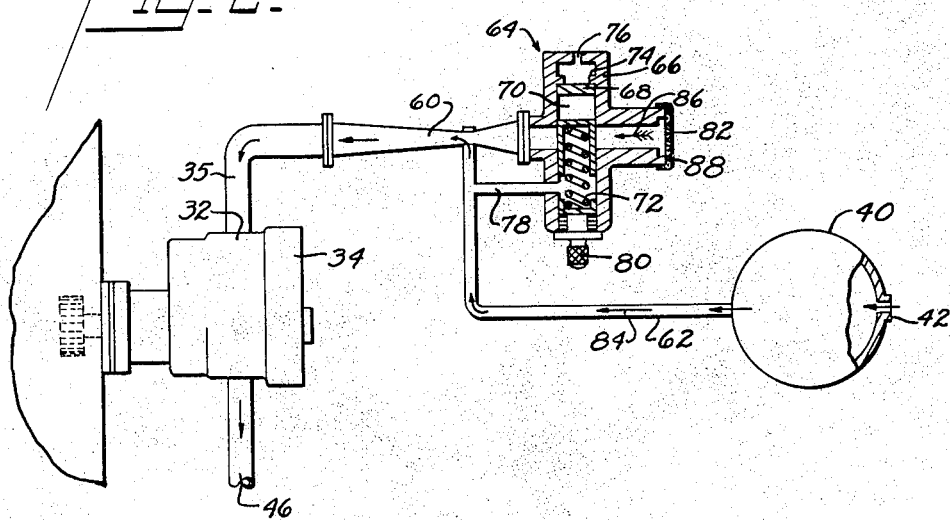
Figure 2 shows how the subject matter of this invention may be of benefit when incorporated in a system as shown in Figure 3.

Figure 2 shows an improved vacuum system which operates with increased efficiency and greater economy by slight additions and rearrangement of parts. The same pump 34 has a discharge pipe 46 and inlet 32 connected by a pipe 35 to a venturi 60. The instrument 40 is vented at 42 and connected by a pipe 62 to the throat of the venturi.

In lieu of the bleed type relief valve 48 of Figure 1, a throttling type valve 64 is provided. This valve comprises a body 66 with a small piston 68 slidable therein. A port 70 extends transversely through the piston, and an axial opening in its end contains a spring 72 which is biased to hold the piston to the position shown against a shoulder 74 formed in the body. The space at the end of the piston adjacent the shoulder 74 is connected to the atmosphere by a vent 76, while the space at the end of the piston which contains the spring is connected by a small pipe 78 to the pipe 62. A screw 80 is pfovided for adjusting the stress of the spring 72. The improved vacuum system shown in Figure 4 operates as follows:

The pump 34 draws air in at the vent 42 of the instrument through pipes 62 and 35 to the pump inlet 32 and through the pump. No air will be drawn through the air passage 82 at first because the transverse port 70 of the piston is misaligned with the passage. When vacuum in the pipe 62 has reached that value for which the screw 80 is adjusted, the vacuum acting through the pipe 78 upon the end of the piston which contains the spring 72 will pull the piston to a position where the port 70 and passage 82 are aligned, or sufficiently aligned to allow the excess capacity of the pump to be drawn in at the passage 82, through port 70, venturi 60, and pipe 35. The flow through pipe 62 and passage 82 will be in the direction of the arrows 84 and 86 respectively. A screen 88 keeps foreign matter from being drawn through the device.

The advantages of the improved vacuum system shown in Figure 2 will be apparent. The pressure at the Venturi throat, where the pipe 72 enters and the amount of flow through the throat is fixed by the requirement of the instrument 42, and the flow of air into the system at 82 will depend of course on the amount of excess capacity of the pump, the pressure drop of the excess air being a function of the ratio of the excess flow to the required flow and will therefore be lower as the ratio is greater, and due to the nature of a venturi, the pressure in the pipe 35 at the pump inlet 32 will be raised. This in itself is important, but there is another advantage, namely, that while in the conventional system shown in Figure 1, the entire capacity of the pump, both that portion which enters through the screen 58 and that portion which enters through the instrument 42, must be reduced to the vacuum required by the instrument, in the improved system Figure 2, only that portion required by the instrument need be drawn to that low value, the remainder of the capacity of the pump being taken through the system at a higher pressure.

While one specific embodiment of the invention has been shown and described, and its superiority noted, it will be apparent that the invention may be employed to good advantage in substantially any circulating fluid system where it is desirable to raise the pressure on the low pressure side of the circuit, which will be at the intake of the pressure producing means. This pressure rise is accomplished with little change in conventional practice and the necessary addition includes no moving parts, nor does it add to the power required to operate the system.

Throughout the specification and claims we have used the word "venturi," but it will be understood that this term is to be construed in its broader sense to include any device having its passageway restricted at one part to cause increased rate of flow and a consequent lowered pressure in the restricted part.

So, also, the term "throat" when applied to a venturi or its equivalent should be construed to include any connection near enough to the throat to get the benefit of the increased flow and lowered pressure.

We claim:

1. A vacuum system comprising, in combination, an enclosure within which a vacuum is to be created, a pump, means containing a duct from the atmosphere to the pump inlet, said means including a vacuum-openable valve and a venturi, said venturi being between said valve and said inlet, a passageway connecting said enclosure to the throat of said venturi, and means containing an opening connecting the said passageway to the vacuum-openable valve to open said valve and connect the pump inlet to the atmosphere.

2. A vacuum system comprising, in combination, an enclosure within which a vacuum is to be created, a pump, means containing a duct from the atmosphere to the pump inlet, said means including a valve having vacuum-operative mechanism for varying the flow capacity of said duct and a venturi between said valve and said inlet, means containing a passageway from the atmosphere to the throat of the venturi, said passageway passing in part through said enclosure, and means containing an opening connecting the vacuum-operative mechanism of the valve to the said passageway for opening said valve.

3. A vacuum system comprising, in combination, an enclosure within which a vacuum is to be created, a pump, means adapted to provide a duct leading from the atmosphere to the pump inlet, said means including a vacuum-openable valve and a venturi, said venturi being between said valve and said inlet, means containing a vacuum passageway for connecting said enclosure to the throat of said venturi, a piston in said valve operable by suction for opening said valve, means enclosing a vacuum chamber around one end of said piston, and means containing an opening connecting the vacuum passageway to said chamber.

4. The structure defined in claim 2 wherein the piston is spring-biased to closed position.

5. A vacuum system comprising, in combination, an enclosure within which a vacuum is to be created, a pump, means adapted to provide a duct for connecting the inlet of said pump to the atmosphere, said means including a piston valve and a venturi, said venturi being located between said piston valve and said inlet, means containing a passageway for connecting said enclosure to the throat of said venturi, a spring in said valve at one end of said piston for urging said piston endwise to a closed position, and means containing an opening connecting said passageway to the space in said valve at the said end of said piston.

JULIUS HULMAN.
BERNARD BEAMAN.